FIG. 4.

UNITED STATES PATENT OFFICE.

WILLIAM BARNUM COWLES, OF CLEVELAND, OHIO, ASSIGNOR TO THE LONG ARM SYSTEM COMPANY, OF SAME PLACE.

HYDRAULIC SYSTEM FOR CLOSING BULKHEAD-DOORS.

SPECIFICATION forming part of Letters Patent No. 631,898, dated August 22, 1899.

Application filed April 14, 1899. Serial No. 713,030. (No model.)

*To all whom it may concern:*

Be it known that I, WILLIAM BARNUM COWLES, a citizen of the United States, residing at Cleveland, in the county of Cuyahoga and State of Ohio, have invented certain new and useful Improvements in Hydraulic Systems for Closing Bulkhead-Doors; and I do hereby declare the following to be a full, clear, and exact description of the invention, such as will enable others skilled in the art to which it appertains to make and use the same.

My invention relates to improvements in apparatus for opening and closing bulkhead-doors, hatches, ports, valves, gates, and other reciprocating devices, and while designed especially for use on shipboard it may be used advantageously in factories, theaters, large buildings, or any other place where such a system is necessary or desirable.

The objects of my invention are, first, to construct an apparatus which shall be simple, durable, positive in its action, reliable, and not likely to get out of order, by means of which a series of mechanical devices situated at a distance from the operating-point may be all operated simultaneously in case of an emergency; second, to provide a system in which the power for operating a number of mechanical devices will be supplied to the said devices through a fluid-pressure system and will be maintained at a predetermined pressure therein, and, third, to provide means at each device to be operated whereby the said device may be controlled at will.

Reference is had to the accompanying drawings, in which the same parts are indicated by the same letters throughout the several views.

My present invention is intended as an improvement upon the inventions shown in the United States Patents Nos. 564,474, 589,958, 605,399, and 608,838, granted to me July 21, 1896, September 14, 1897, June 7, 1898, and August 9, 1898, respectively. This application is more particularly intended to cover certain improvements in the apparatus broadly claimed in my Patents Nos. 605,399 and 608,838 aforesaid and simplifications in the details thereof.

As the general idea of the operation of the system from the central station has been fully described in the two patents last referred to it will be more convenient in the present application first to assume that there is a lower or ordinary working pressure normally maintained in the system under which each separate device may be operated at will, while a higher or emergency pressure may be rapidly transmitted through the system whereby all the bulkhead-doors or other reciprocating devices in the system may be simultaneously operated from a central station or from any one of a plurality of main or central stations. With this assumption I will first explain the apparatus for operating each door or other sliding device under both working and emergency pressure, and will then describe the central station and the means for shifting from ordinary to emergency pressure or the reverse.

Figure 4:
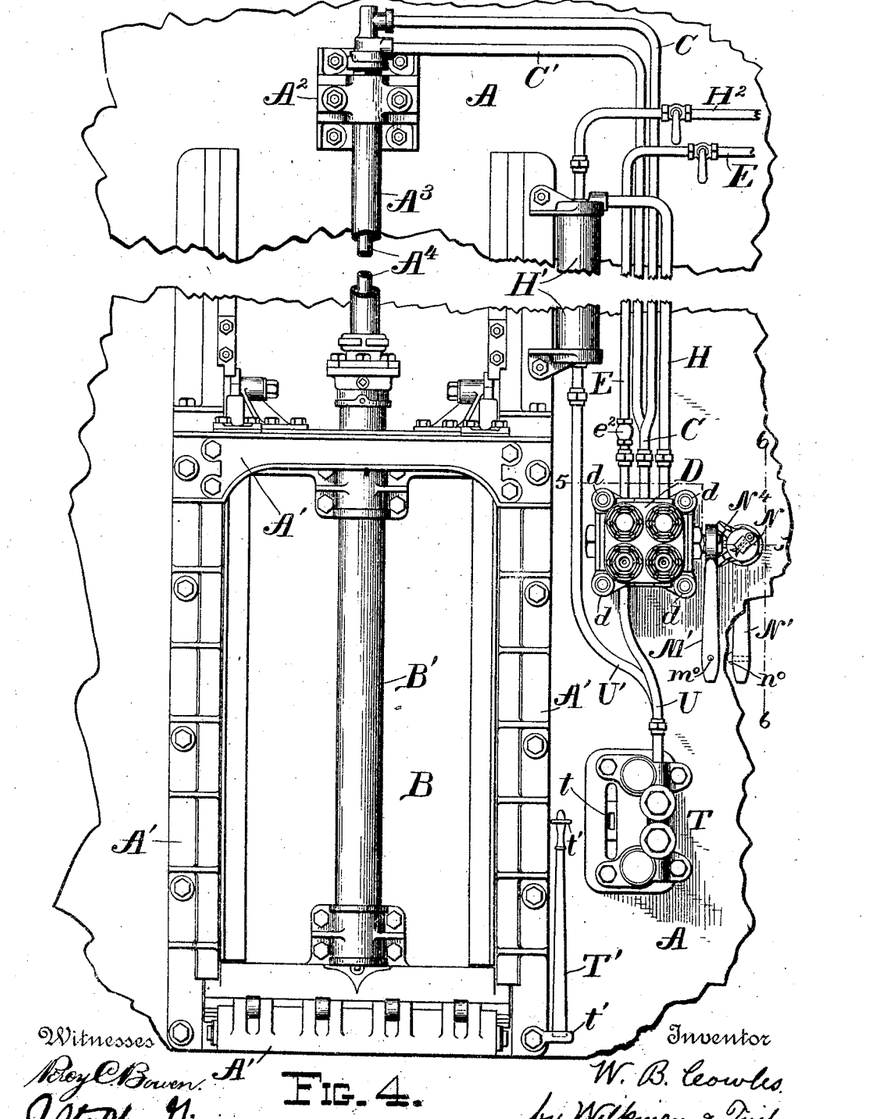
Fig. 4 is a front elevation of a sliding bulkhead-door with the apparatus for operating the same, parts being broken away.
Figure 5:
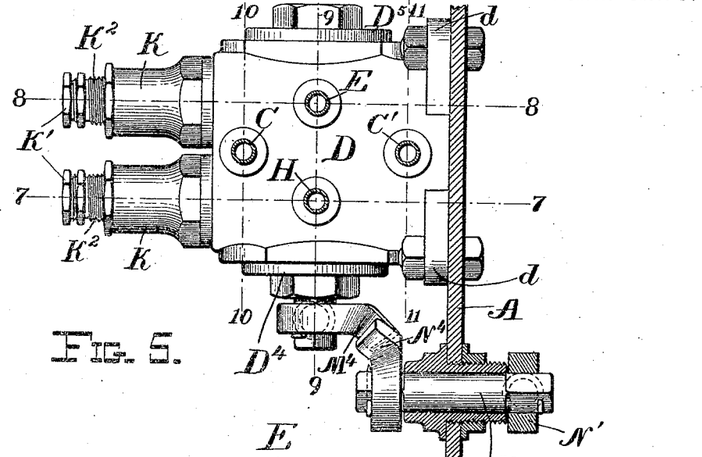
Fig. 5 represents a section made by the plane 5 5 of Fig. 4 and looking down and shows the valve-casing in plan.
Figure 6:
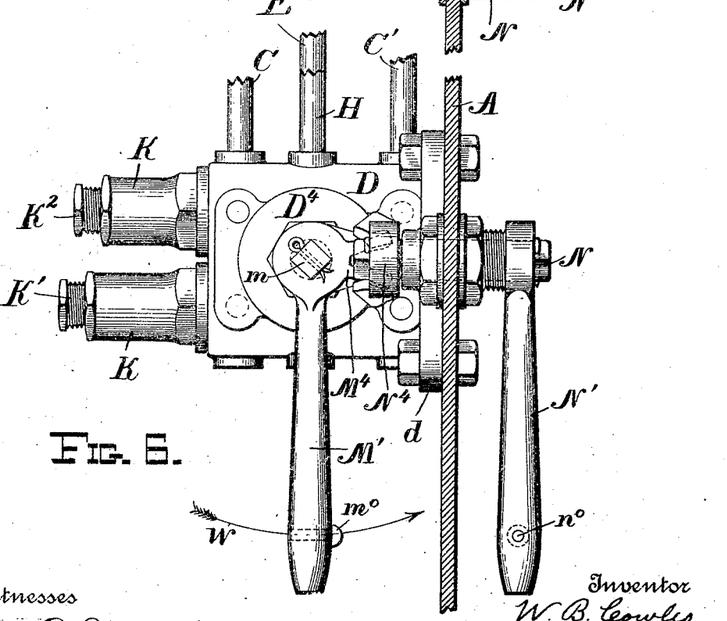
Fig. 6 represents a section through the bulkhead made by the plane 6 6 of Fig. 4 and looking to the left and shows the valve-casing and operating hand-lever in elevation.
Figure 7:
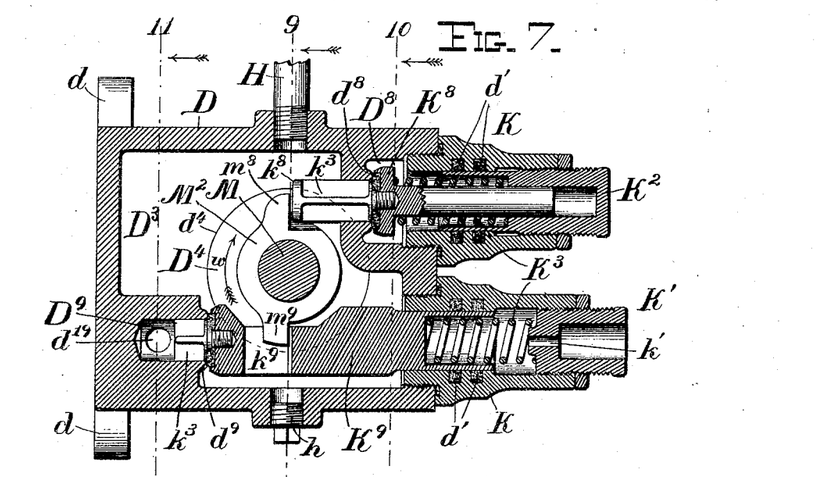
Fig. 7 represents a section through the valve-casing and its contents made by the plane 7 7 of Figs. 9 to 11 and looking in the direction of the arrows.
Figure 8:
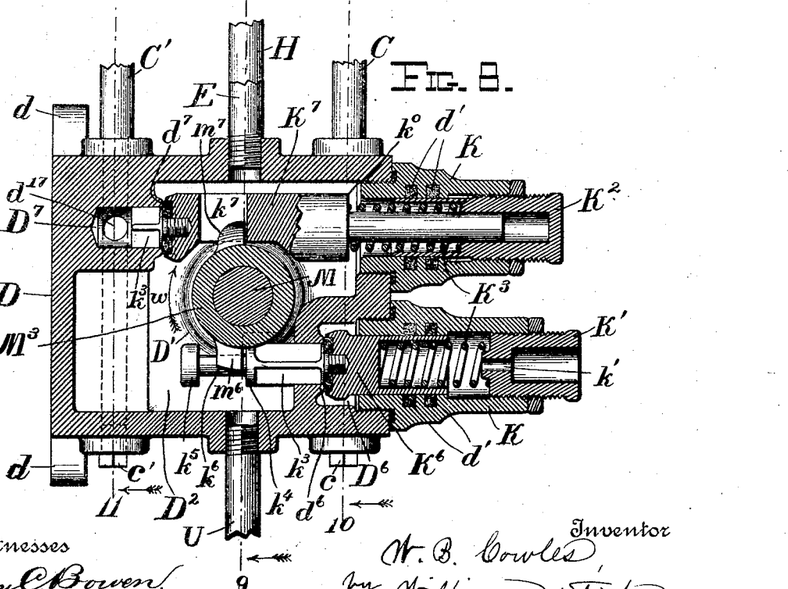
Fig. 8 represents a similar action made by the plane 8 8 of Figs. 9 to 11 and looking in the direction of the arrows.
Figure 9:
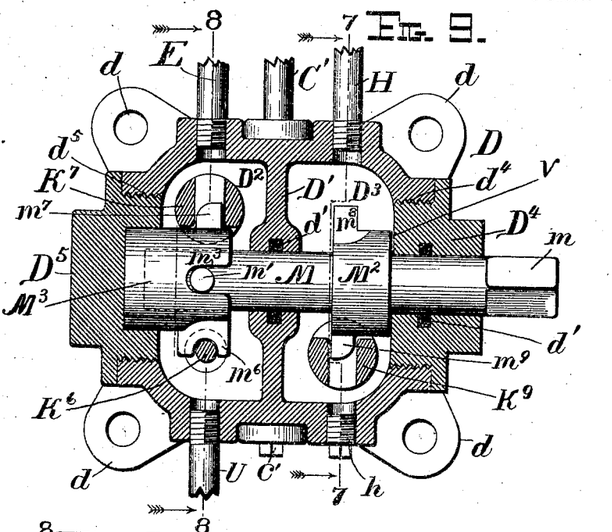
Fig. 9 represents a section made by the plane 9 9 of Figs. 7 and 8 and looking in the direction of the arrows.
Figure 10:
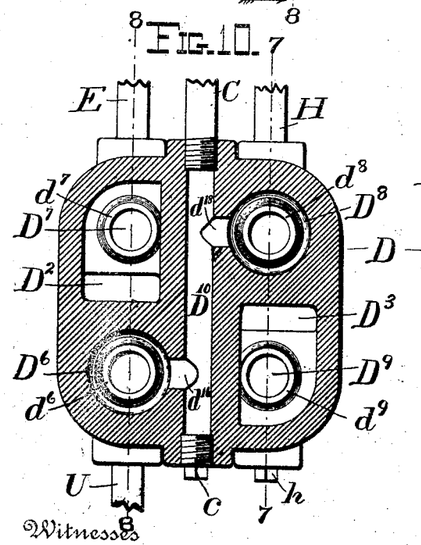
Fig. 10 represents a section through the valve-casing made by the plane 10 10 of Figs. 7 and 8 and looking in the direction of the arrows, the valves being omitted.
Figure 11:
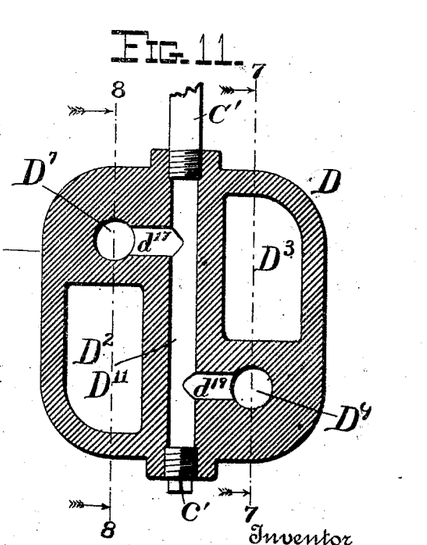
Fig. 11 represents a section through the valve-casing made by the plane 11 11 of Figs. 7 and 8 and looking in the direction of the arrows, the valves being omitted.

Referring, therefore, first to Fig. 4, in which a vertically-sliding bulkhead-door is shown as a typical "reciprocating device," to be operated according to my invention, A represents an ordinary bulkhead having a frame A' for a sliding door B, preferably such a door as is described in my Patent No. 605,399 aforesaid. The door B has secured thereto the cylinder B', into which passes the hollow piston-rod $A^3$, fast to the bracket $A^2$, secured to the bulkhead A. This hollow piston-rod $A^3$ incloses a smaller hollow rod or pipe $A^4$, with an annular space between the two for the passage of fluid, and this annular space opens into the cylinder B' above the piston, (not shown,) while the inner hollow rod $A^4$ opens into the cylinder B' below the piston. The details of the piston and the openings aforesaid are fully described in my Patent No. 605,399 aforesaid. Thus, as fully described in that patent, fluid-pressure through the inner hollow rod $A^4$ will force the door down, while fluid-pressure through the annular space between the hollow piston-rod $A^3$ and the pipe $A^4$ will force the door upward.

The pipe $A^4$ is connected with the valve-casing D by means of the pipe C, while the annular space between the pipe $A^4$ and the hollow piston-rod $A^3$ is connected with the valve-casing D by means of the pipe C'.

The valve-casing D is secured to the bulkhead A near the door by means of the ears d or in any other convenient way. This casing and its contents are shown in detail in Figs. 5 to 11, in which the valve-casing D is separated by means of the web D' into the two principal chambers $D^2$ and $D^3$, which I shall call the "fluid-pressure chamber" and the "exhaust-chamber," and the ends of these chambers are closed by the screw-plugs $D^4$ and $D^5$, which plugs permit access to the interior of the valve-casing.

The pipe E, leading to the accumulator F or other source of fluid-pressure, opens into the chamber $D^2$, while the return-pipe H opens into the exhaust-chamber $D^3$ and connects the same with the reservoir H', connected to the return-pipe $H^2$.

Opening into the fluid-pressure chamber $D^2$ is the valve-chamber $D^6$, having the valve-seat $d^6$, and the passage $D^7$, having the valve-seat $d^7$ at its inner end, while opening into the exhaust-chamber $D^3$ is the valve-chamber $D^8$, having the valve-seat $d^8$, and the passage $D^9$, having the valve-seat $d^9$. The valve-chambers $D^6$ and $D^8$ are connected by the passages $d^{16}$ and $d^{18}$ and the passage $D^{10}$ with the pipe C, while the passages $D^7$ and $D^9$ are connected by the passages $d^{17}$ and $d^{19}$, and the passage $D^{11}$ with the pipe C'. The passages $D^{10}$ and $D^{11}$ are bored through the casing, and the ends opposite to C and C' may be connected to similar pipes for opening and closing other doors, or may be stopped up, as with the screw-plugs c c'. (See Figs. 10 and 11.)

The puppet-valves $K^6$ and $K^8$ are mounted in the valve-chambers $D^6$ and $D^8$, respectively, while the puppet-valves $K^7$ and $K^9$ are mounted in the fluid-pressure chamber $D^2$ and the exhaust-chamber $D^3$, respectively. Each of these valves is pressed toward its seat by a spring $K^2$, which spring is under a tension that may be regulated by screwing upon the cap K' with the valves $K^6$ and $K^7$ or upon the cap $K^2$ with the valves $K^7$ and $K^8$. The springs $K^2$ also return the shaft M and handles M' and N' to their normal position, the said springs on the valves $K^7$ and $K^8$ being more especially for this purpose, as will be hereinafter described. The cap K' is perforated, as at k', to prevent back pressure behind the valves $K^6$ and $K^7$. The stems of the valves $K^6$ to $K^8$ are mounted in sleeves K, screwed into the valve-casing D. Beyond the valves are the cruciform guide-stems $k^2$. The valve $K^6$ has the reduced portion $k^6$ between the shoulders $k^4$ and $k^5$ to engage the lifting-toe $m^6$. The valve $K^8$ has the head $k^8$ to engage the lifting-toe $m^8$, and the valves $K^7$ and $K^9$ have their stems slotted, as at $k^7$ and $k^9$, to engage the lifting-toes $m^7$ and $m^9$, respectively.

The shaft M, journaled in the casing D and in the screw-plugs $D^4$ and $D^5$, is provided with collars $M^2$ and $M^3$, mounted in the chambers $D^3$ and $D^2$, respectively, the collar $M^2$ having the lifting-toes $m^8$ and $m^9$ thereon, and the collar $M^3$ having the lifting-toes $m^6$ and $m^7$ thereon. These lifting-toes are so arranged that before the shoulder $k^9$ of the valve $K^7$ brings up against the face of the sleeve K, thus checking the further rotation of the shaft M, the toe $m^6$ will bring up against the shoulder $k^5$ and will lock the valve $K^6$ on its seat, while the toe $m^9$ will bring up against the end of slot $k^9$ and lock the valve $K^9$ on its seat. For convenience in journaling the shaft M the collar $M^3$ is made to fit in a recess in the plug $D^5$ and is locked against turning on the shaft M in any convenient way, such as the pin m', engaging in the groove $m^3$ of the collar or by a squared end, such as m, (see Fig. 9,) fitting in a corresponding recess in the collar $M^3$. The handle M' fits over the squared end m of the shaft M, so that the shaft M may be turned from either side of the bulkhead A. The handle M' has a boss with sector-beveled gear $M^4$ thereon, meshing in the sector-beveled gear $N^4$ on the spindle N, which is journaled in the bulkhead and carries on the opposite side of the bulkhead from the shaft M a handle N'. Thus if either of the handles M' or N' be moved through an angle it will rotate the shaft M through a like angle and will operate the puppet-valves by hand. The angular motion of the handles M' and N' is limited by the throw of the puppet-valves, as will be hereinafter described. The direction of motion of the handles for, say, the door-opening position is suggested by the button $m^0$ or $n^0$ on that side of the handle, whereby an operator can know in the dark in which direction to throw the handle. The various springs $K^3$ are set to hold the puppet-valves $K^6$ to $K^9$ on their seats at the usual working pressure—say one hundred and fifty pounds per square inch.

It will be seen that an operator can open or close any door by simply turning either of the handles $M'$ or $N'$ in the proper direction. Thus suppose the door B is closed, and it is desired to open the same without disturbing any of the other doors, hatches, &c., in the system. The operator moves the handle $M'$ in the direction of the arrow W in Fig. 6. This causes the shaft M to turn in the direction of the arrows $w$ in Figs. 7 and 8, causing the toe $m^7$ to move the valve $K^7$ off its seat to admit fluid-pressure from the chamber $D^2$ to the passage $D^7$ and from it to the pipe $C'$. At the same time the valve $K^6$ is locked on its seat by the toe $m^6$, and thus prevents any fluid-pressure being transmitted through the chamber $D^6$ and pipe C. The same motion of the shaft M operates in the exhaust-chamber $D^3$ to move the valve $K^9$ off its seat, permitting any fluid below the piston in the cylinder $B'$ to flow through the pipe C, the passages $D^{10}$ and $d^{18}$, and the chamber $D^8$ to the exhaust-chamber $D^3$, and thence through the pipe H to the reservoir $H'$. To close the door by hand, move the handle $M'$ or $N'$ in the opposite direction. This will rock the shaft M against the direction of the arrows $w$, and the toes $m^6$ and $m^9$ will move the valves $K^6$ and $K^9$ off their seats, while their springs $K^3$, added to the pressure, will hold the valves $K^7$ and $K^8$ on their seats. This will allow fluid under pressure to pass from the chamber $D^2$ through the chamber $D^6$ and passages $d^{16}$ and $D^{10}$ to the pipe C to run down the door, while any fluid above the fixed piston in the cylinder $B'$ will be forced up through the annular space and the pipe $C'$ and through the passages $D^{11}$, $d^{19}$, and $D^9$, and thence through the chamber $D^3$ and pipe H to the reservoir $H'$. Now suppose the pressure in the pipe E to be considerably raised, suddenly or otherwise—say from one hundred and fifty to three hundred pounds—as for closing all the doors under the emergency action. The increased pressure transmitted from the pipe E to the chamber $D^2$ would force back the valve $K^6$ and, flowing into the chamber $D^6$, will pass through the passages $d^{16}$ and $D^{10}$ to the pipe C, and thence to the lower end of the cylinder $B'$. Any fluid in the cylinder $B'$ feeling the effect of this increased pressure would rise through the pipe $C'$ and, pressing on the fluid in the passages $D^{11}$ and $d^{19}$, would force the valve $K^9$ open and, flowing into the chamber $D^3$, would escape through the pipe H. The pressure in the passages $D^{10}$ and $d^{18}$, assisted by the spring $K^3$, will keep the valve $K^8$ on its seat, while the pressure in the chamber $D^2$ also keeps the valve $K^7$ on its seat. Thus it will be seen that materially increasing the pressure in the pipe E will cause the doors to close, but without affecting the position of the shaft M or of the handles $M'$ or $N'$.

It will be seen that there is no wire-drawing of the emergency-pressure through the valve $K^6$ nor of the release through the valve $K^9$, as there was in the former arrangement, to make the emergency closing slow and uncertain. These valves $K^6$ and $K^9$ are spring-seated puppet-valves, which when forced off their seats by a certain pressure (dependent on the adjustment of the springs $K^3$) will "pop" open to the full lift and stay there until the pressure is reduced much below that required to open them, thus giving a positive and full flow to close the door under emergency. This action is obtained by packing the stems of valves at $d'$ and making said stems much larger in cross-section area than the opening in the valve-seats. Thus when the emergency-pressure once gets into the chamber $D^6$ and can act on the increased area of the valve it pops it open and holds it open. When liberty action is necessary, as to set a man at liberty who is imprisoned in one of the compartments—that is, the opening or closing of a single door by hand, (and this action occurs only during the period of emergency-pressure and action)—the heels of the toes $m^6$ and $m^9$ push down and lock down the valves $K^6$ and $K^9$ and hold them there during the liberty period. Thus there can be no escape of pressure, and therefore this liberty action is positive and certain. The easy and quick adjustment of springs is an important and novel feature. All the valve stems or sleeves are so packed that each spring can be quickly and independently adjusted under pressure, (the only proper way to adjust, as the adjustment is always by trial and relative.) The positive and sure return of the toes, rock-shaft, and handles to their normal position is a vital matter in the success of the arrangement. Should they remain so as to leave some of the passages open, the emergency action could not take place. In this application there are no special springs or devices for this return. The return action of the valve-springs on the toes does it. There is practically no chance of the two shafts sticking in their bearings, and they are absolutely unaffected by variation in pressure (except the slight increase in friction on the thrust-collar $v$, Fig. 8, from pressure on end of shaft in pressure-chamber $D^2$.)

The practical difficulties from grit, sediment and foreign substances in the fluid used render it necessary for a successful device of this kind to be fitted with valve-seats arranged so as to be self-cleaning, and valves whose working faces cannot only be renewed quickly and inexpensively, but which are of such a nature as to close tight even when some small foreign substance is caught between them and the seat. In this application these difficulties occurring in practice are avoided by a suitable and novel combination of devices. The removable valve-faces are of a comparatively soft substance, into which grit will press and allow the valve to seat tight. The seats are of the raised-lip type, placed in a vertical plane, so that the flow of liquid will constantly wash and clean them, and so that sediment will fall away from them.

Figures 1, 2, 3:
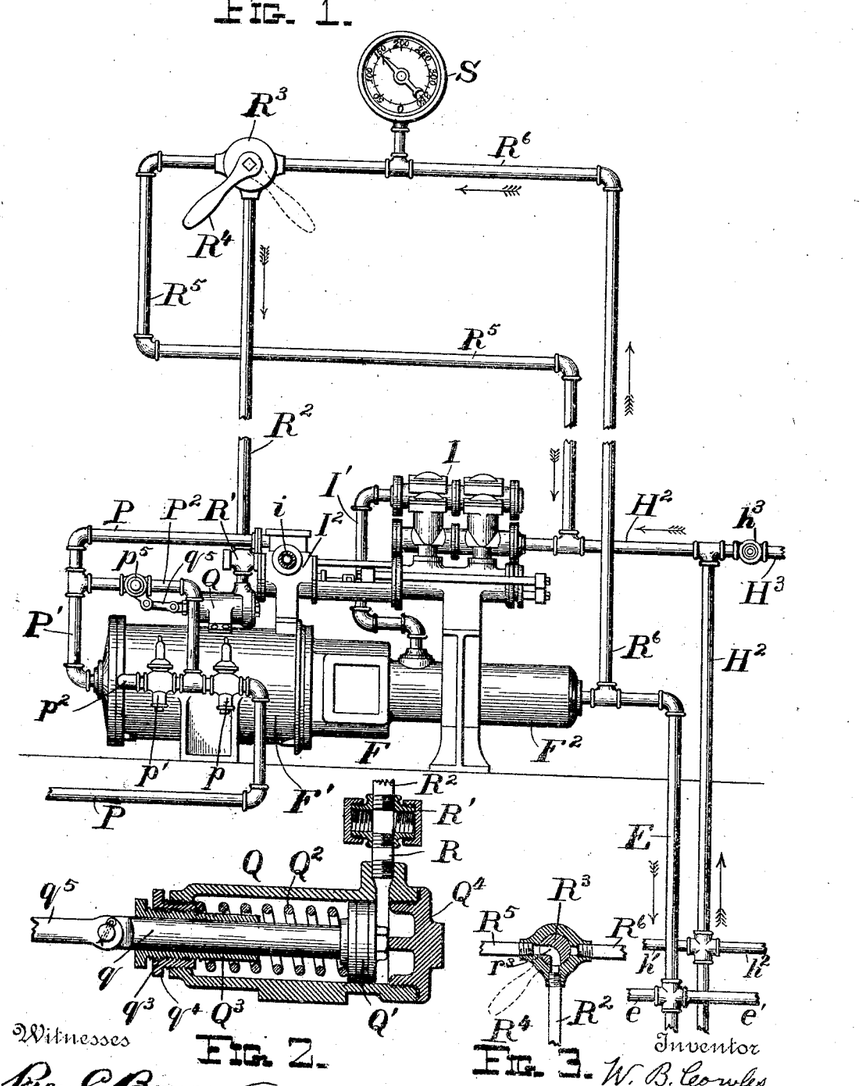
Figure 1 represents a view of the system connected to an accumulator for supplying fluid-pressure to the main line and its branches.
Fig. 2 represents a central vertical section through the emergency-cylinder for operating the valve for applying increased pressure, the scale being enlarged.
Fig. 3 represents a vertical section through the emergency-valve for operating the emergency system.

The pressure is maintained and increased and decreased, as desired, by means of the apparatus shown diagrammatically in Fig. 1, where F represents a steam or other fluid pressure accumulator of any well-known form, F' being the steam or other fluid pressure cylinder and $F^2$ the ram-cylinder thereof. This accumulator, with its pump or compressor I, may be called the "central station" or "source of power and control," hereinafter referred to.

Steam or other fluid pressure is supplied to the steam-cylinder F' through a pipe P from any suitable source. For convenience of description the pipe P and cylinder F' will be hereinafter called the "steam-pipe" and "steam-cylinder," although any other suitable fluid under pressure, such as compressed air, may be admitted to the same. This pipe is preferably provided with reducing-valves $p$ and $p'$ before entering the steam-cylinder. The first reducing-valve is set to reduce the steam-pressure to a predetermined limit—as, for instance, a pressure of one hundred pounds to the square inch—and the second reducing-valve is set to reduce the steam-pressure to about one-half the pressure allowed to pass through the first valve, or about fifty pounds to the square inch, which latter is the normal pressure for working the system.

The steam-cylinders $I^2$ of the accumulator-pumps I are supplied with steam through a pipe P from the interior of the steam-cylinder F', and the supply of steam to the pumps may be automatically regulated in any well-known way. These pumps I when in operation are supplied with fluid through the return-pipe $H^2$ and from a central reservoir for returns, (not shown,) which fluid is forced through the pipe I' into the ram-cylinder $F^2$, whence it is forced through the distributing-main E and its branches to the several doors or other devices to be operated, as shown in my Patent No. 605,399 aforesaid. The pipe $H^3$ and valve $h^3$ are used to fill the system and for making up any losses from leakage. A branch pipe $P^2$ leads from the steam-pipe P between the two reducing-valves $p$ $p'$ to the pipe P', thus serving as a "by-pass" from between the reducing-valves to the cylinder and pumps. A valve $p^5$ is placed in the pipe $P^2$, and when this valve is closed the steam entering the cylinder and pumps must pass through both of the reducing-valves $p$ and $p'$, where its pressure is reduced in two steps to the usual working pressure. When the valve $p^5$ is open, the steam will be admitted to the cylinder and pumps at the pressure with which it leaves the first reducing-valve, thus immediately increasing, generally doubling, the fluid-pressure in the main E and its branches. It will be obvious that other well-known devices for increasing the pressure may be adopted, if desired. The object of increasing or doubling the pressure in the main E is to close all the bulkhead-doors at once, as in case of accident to the ship or in any other emergency, as has already been described.

The valve $p^5$ is opened or closed by means of an emergency power-cylinder Q, which forms a part of a primary system similar in purpose to that described in Letters Patent of the United States granted to me July 21, 1896, No. 564,474, but essentially different therefrom, and may be briefly described as follows: The emergency-cylinder Q contains the piston Q', mounted on the piston-rod $q$, connected by the link $q^5$ to a lever for turning the valve $p^5$. This piston is pushed backward by means of the spring $Q^2$, which spring is adjusted not to yield under the ordinary back pressure in the pipe $H^2$ of the system, but to yield under the full working pressure in the main E. The compression of the spring is adjusted by means of the screw-threaded sleeve $q^4$, and the travel of the piston is limited by means of the sleeve $Q^3$, (see Fig. 2,) which is screw-threaded, as at $q^3$, to engage the said sleeve $q^4$. The end of the cylinder Q is preferably closed by means of a screw-head $Q^4$. The pipe R from the outer end of the cylinder Q is preferably connected to a cross R', as shown in Fig. 2, so that two or more emergency-stations may be connected to the emergency power-cylinder Q. To this cross R' are connected one or more pipes $R^2$, each of which is connected to an emergency-valve $R^3$, controlled by a hand-lever $R^4$. The three-way valve $R^3$ has a passage $r^3$, (see Fig. 3,) which may be made to connect either the pipes $R^2$ and $R^5$, as shown in Fig. 3, or the pipes $R^2$ and $R^6$. (See Fig. 1.) The pipe $R^5$ is connected to the return-pipe $H^2$, while the pipe $R^6$ is connected to the pressure-main E and by it to the ram-cylinder $F^2$, thus always containing the same pressure as in the latter. The gage S indicates the pressure in this pipe $R^6$, and consequently the pressure in the main E. It will be evident, if the emergency-valve $R^3$ be held in the position shown in full lines in Fig. 1 and in dotted lines in Fig. 3, that connection will be established between the return-pipe $H^2$ and cylinder Q, in which the pressure will not be sufficient to move the piston Q' and valve $p^5$, and hence the system will remain under the ordinary working pressure, (indicated by the gage S.) Now if the valve-lever $R^4$ be moved to the position shown in dotted lines in Fig. 1 direct communication will be established between the pressure-main E and the cylinder Q, and the piston Q' will be pressed back, moving the valve $p^5$ and admitting increased pressure to the cylinder F' and steam-cylinders $I^2$, thus increasing the pressure in the ram-cylinder $F^2$ and pressure-main E and causing the emergency action at each door or hatch, as has already been described. The increase of pressure required to cause the emergency action will be indicated on the gage S.

In order to provide for accidents to the system or to any part thereof, whereby the motion of one or more doors is affected, I provide means for operating each door by hand, which will now be described.

T represents an ordinary hand-pump of any suitable construction bolted to the bulkhead A and operated by a handle T', which steps in the reciprocating socket t. When not in use, this handle is preferably held in clips t' at one side of the door-frame, as shown in Fig. 4. The pipe U delivers fluid under pressure from the pump T to the chamber $D^2$ of the valve-casing D, while this fluid so delivered is drawn through the pipe U' from the reservoir H'. By turning the handle in the proper position for opening or closing and operating the pump the door may be raised or lowered by hand irrespective of the operation of the rest of the system. During this action the check-valve $e^2$ in the pipe E, Fig. 4, confines the pressure from hand-pumps to the chamber $D^2$. Thus it will be seen that all the doors, hatches, or the like may be operated simultaneously by the simple movement of a hand-lever at some central point or from any one of several central points, while each door or hatch may always be opened or closed by itself by simply turning a handle without affecting the other doors, hatches, or the like in the system. Thus a man imprisoned in a water-tight compartment may open his door and escape by simply turning a hand-lever, the door closing again automatically after his liberation, while every other door or hatch on the ship is jammed tight. The same door may be opened an indefinite number of times to permit the escape of a large number of men, and yet will close automatically whenever the hand-lever is released. This automatic closing will continue as long as the emergency pressure is on. Moreover, each door or hatch may be opened or closed by hand-power should the connection from the fluid-pressure main be broken, as by an enemy's shell or from any other cause.

While I have shown a single door operated by a single fluid-pressure pipe, I intend that the fluid-pressure main and return-pipe $H^2$ shall have a number of branch pipes, such as e and e', h' and $h^2$, respectively, in Fig. 1, each connected to a door or other device to be operated.

While this specification and drawings represent the invention as applied to bulkhead-doors, it will be understood that these were selected as the particular form of reciprocating device to which the invention is probably most applicable; but the same idea may be applied to closing doors in tunnels or drifts of mines, to closing hatches, elevator-wells, and passages in warehouses and the like, to closing air-passages in fireproof buildings, to simultaneously operating "fire-curtains" and opening all exits in theaters, and to a great variety of purposes where it is desired to supply a system for simultaneously closing a number of doors and yet permitting the separate opening and closing of each particular door without affecting the others in the system.

It will be obvious that the herein-described system and apparatus may be operated by either hydraulic or pneumatic fluid-pressure, and it is my purpose not to limit myself to the use of any particular kind of fluid-pressure.

It will be obvious that a great many modifications might be made in the herein-described apparatus which could be used without departing from the spirit of my invention.

Having thus described my invention, what I claim, and desire to secure by Letters Patent of the United States, is—

1. In a fluid-pressure system of the character described, the combination with a fluid-pressure main, of an emergency-cylinder, with a piston therein, a valve operated by said piston, mechanism controlled by said valve for increasing the pressure in said main, a hand-operated valve for admitting fluid-pressure to said emergency-cylinder, a door, and puppet-valves controlled by the increased pressure for moving said door to the closing position, with additional puppet-valves to control the fluid for opening the door, with mechanism controlled by hand for operating said puppet-valves independently of the increased pressure, substantially as described.

2. In a fluid-pressure system of the character described, the combination with a fluid-pressure main, of an emergency-cylinder, with a piston therein, a valve operated by said piston, mechanism controlled by said valve for increasing the pressure in said main, a door and a cylinder and piston for moving said door, and spring-seated puppet-valves controlling the supply of fluid to said cylinder, and operated by increase of pressure for closing the door, with independent means operated by hand for tripping said valves, substantially as described.

3. In a fluid-pressure system of the character described, the combination with a fluid-pressure main, of an emergency-cylinder, with a piston therein, a valve operated by said piston, mechanism controlled by said valve for increasing the pressure in said main, a door, pipes for fluid-pressure, puppet-valves operated by the increased pressure for admitting fluid through said pipes and closing said door with independent means operated by hand for lifting said puppet-valves and thus moving said door, substantially as described.

4. In a fluid-pressure system of the character described, the combination with a fluid-pressure main, of an emergency-cylinder, with a piston therein, a valve operated by said piston, mechanism controlled by said valve for increasing the pressure in said main, a door, pipes for fluid-pressure, puppet-valves operated by the increased pressure for admitting fluid through said pipes and closing said door, a rock-shaft having toes engaging said puppet-valves, and a hand-lever on said rock-shaft, substantially as described.

5. In a fluid-pressure system of the character described, the combination with a fluid-pressure main, of an emergency-cylinder, with a piston therein, a valve operated by said piston, mechanism controlled by said valve for increasing the pressure in said main, a door, pipes for fluid-pressure, puppet-valves operated by the increased pressure for admitting fluid through said pipes and moving said door, a rock-shaft having toes engaging said puppet-valves, a hand-lever and a sector beveled gear carried by said rock-shaft, a counter-shaft having a sector beveled gear meshing with that on the rock-shaft, and projecting through the bulkhead, and a second hand-lever on the end of this counter-shaft and on the opposite side of the bulkhead from the first, substantially as described.

6. In an emergency system of the character described, the combination with a fluid-pressure main and means for suddenly increasing the pressure in said main when desired, of a door and a cylinder and piston for moving said door, and spring-seated puppet-valves controlling the supply of fluid to said cylinder, and operated by increase of pressure, with independent means operated by hand for tripping said valves, substantially as described.

7. In a fluid-pressure system of the character described, the combination with a fluid-pressure main and means for suddenly increasing the pressure in said main when desired, of a door, pipes for fluid-pressure, puppet-valves operated by the increased pressure for admitting fluid through said pipes and closing said door, with independent means operated by hand for lifting said puppet-valves and thus moving said door, substantially as described.

8. In a fluid-pressure system of the character described, the combination with a fluid-pressure main and means for suddenly increasing the pressure in said main when desired, of a door, pipes for fluid-pressure, puppet-valves operated by the increased pressure for admitting fluid through said pipes and moving said door, a rock-shaft having toes engaging said puppet-valves, and a hand-lever on said rock-shaft, substantially as described.

9. In a fluid-pressure system of the character described, the combination with a fluid-pressure main and means for suddenly increasing the pressure in said main when desired, of a door, pipes for fluid-pressure, puppet-valves operated by the increased pressure for admitting fluid through said pipes and moving said door, a rock-shaft having toes engaging said puppet-valves, a hand-lever and a sector beveled gear carried by said rock-shaft, a counter-shaft, having a sector beveled gear meshing with that on the rock-shaft, and projecting through the bulkhead, and a second hand-lever on the end of this counter-shaft and on the opposite side of the bulkhead from the first, substantially as described.

10. A fluid-pressure system for operating bulkhead-doors and the like, comprising an accumulator, with means for suddenly increasing the pressure in said accumulator, of a fluid-pressure main leading from said accumulator, a valve-casing connected to said fluid-pressure main, puppet-valves mounted in said casing, means for moving said puppet-valves either by hand or by increased pressure, a cylinder and piston for operating the door, and pipes leading from said valve-casing into said cylinder, respectively above and below the piston, substantially as and for the purposes described.

11. A fluid-pressure system for operating bulkhead-doors and the like, comprising an accumulator, with means for suddenly increasing the pressure in said accumulator, of a fluid-pressure main leading from said accumulator, a valve-casing connected to said fluid-pressure main, puppet-valves mounted in said casing and normally held on their seats by springs but yielding to the increased pressure, independent means for moving said puppet-valves by hand, a cylinder and piston for operating the door; and pipes leading from said valve-casing into said cylinder, respectively above and below the piston, substantially as described.

12. A fluid-pressure system for operating bulkhead-doors and the like, comprising an accumulator, with means for suddenly increasing the pressure in said accumulator, of a fluid-pressure main leading from said accumulator, a valve-casing connected to said fluid-pressure main, puppet-valves mounted in said casing and normally held on their seats by springs, but yielding to the increased pressure, independent means for moving said puppet-valves by hand and operative on both sides of the bulkhead, a cylinder and piston for operating the door, and pipes leading from said valve-casing into said cylinder, respectively above and below the piston, substantially as described.

13. A fluid-pressure system for operating bulkhead-doors and the like comprising an accumulator, with means for suddenly increasing the pressure in said accumulator, of a fluid-pressure main, a valve-casing divided into two chambers that is a fluid-pressure chamber, and an exhaust-chamber, double passages opening into each chamber, a pair of puppet-valves in each chamber and normally pressed on their seats by springs and controlling said passages, two of said valves yielding to the increased pressure for closing the door, with independent means operated by hand for simultaneously lifting one of the valves in each chamber, a cylinder and piston for moving the door, a pipe leading from said valve-casing into said cylinder at one side of said piston, and another pipe leading from said valve-casing into said cylinder at the other side of said piston, substantially as described.

14. A fluid-pressure system for operating bulkhead-doors and the like, comprising an accumulator, with means for suddenly increasing the pressure in said accumulator, of a fluid-pressure main, a valve-casing divided into two chambers that is a fluid-pressure chamber, and an exhaust-chamber, double passages opening into each chamber, a pair of puppet-valves in each chamber and normally pressed on their seats by springs and controlling said passages, two of said valves yielding to the increased pressure for closing the door, with independent means operated by hand and from each side of the bulkhead, for simultaneously lifting one of the valves in each chamber, a cylinder and piston for moving the door, a pipe, leading from said valve-casing into said cylinder at one side of said piston, and another pipe leading from said valve-casing into said cylinder at the other side of said piston, substantially as described.

15. A fluid-pressure system for operating bulkhead-doors and the like, comprising an accumulator, with means for suddenly increasing the pressure in said accumulator, of a fluid-pressure main, a valve-casing divided into two chambers, that is a fluid-pressure chamber, and an exhaust-chamber, double passages opening into each chamber, puppet-valves controlling said passages, a rock-shaft with lifting-toes for opening one of each pair of said valves in each chamber, a hand-lever for rocking said rock-shaft, a cylinder and piston for moving the door, a pipe leading from said valve-casing into said cylinder at one side of said piston and another pipe leading from said valve-casing into said cylinder at the other side of said piston, substantially as described.

16. A fluid-pressure system for operating bulkhead-doors and the like, comprising an accumulator, with means for suddenly increasing the pressure in said accumulator, of a fluid-pressure main, a valve-casing divided into two chambers, that is a fluid-pressure chamber, and an exhaust-chamber, double passages opening into each chamber, puppet-valves controlling said passages, a rock-shaft with lifting-toes for opening one of each pair of said valves in each chamber, a hand-lever for rocking said rock-shaft, a counter-shaft gearing with said rock-shaft and projecting through the bulkhead, a hand-lever on the said counter-shaft on the opposite side of the bulkhead from the first hand-lever, a cylinder and piston for moving the door, a pipe leading from said valve-casing into said cylinder at one side of said piston, and another pipe leading from said valve-casing into said cylinder at the other side of said piston, substantially as described.

17. A fluid-pressure system for operating bulkhead-doors and the like, comprising an accumulator, with means for suddenly increasing the pressure in said accumulator, of a fluid-pressure main, a valve-casing divided into two chambers, that is a fluid-pressure chamber, and an exhaust-chamber, double passages opening into each chamber, puppet-valves controlling said passages, adjustable springs holding said valves on their seats under normal pressure, two of said valves yielding to increased pressure for closing the door, a rock-shaft with lifting-toes for opening one of each pair of said valves in each chamber, and for holding one of the other valves on its seat, a hand-lever for rocking said rock-shaft, a cylinder and piston for moving the door, a pipe leading from said valve-casing to said cylinder at one side of said piston, and a pipe leading from said valve-casing to said cylinder at the other side of said piston, substantially as described.

18. A fluid-pressure system for operating bulkhead-doors and the like, comprising an accumulator, with means for suddenly increasing the pressure in said accumulator, of a fluid-pressure main, a valve-casing divided into two chambers that is a fluid-pressure chamber, and an exhaust-chamber, double passages opening into each chamber, puppet-valves provided with elongated slots in their stems and controlling said passages, adjustable springs holding said valves on their seats under normal pressures, two of said valves yielding to increased pressure for closing the door, a rock-shaft with lifting-toes projecting into said elongated slots, for opening one of each pair of said valves in each chamber, and for holding one of the other valves on its seat, a hand-lever for rocking said rock-shaft, a cylinder and piston for moving the door, a pipe leading from said valve-casing to said cylinder at one side of said piston, and another pipe leading from said valve-casing to said cylinder at the other side of said piston, substantially as described.

19. A fluid-pressure system for operating bulkhead-doors and the like, comprising an accumulator, with means for suddenly increasing the pressure in said accumulator, of a fluid-pressure main, a valve-casing divided into two chambers, a fluid-pressure chamber, and an exhaust-chamber, double passages opening into each chamber, puppet-valves normally pressed on their seats and controlling said passages, a rock-shaft with lifting-toes for opening one of each pair of said valves in each chamber, and for holding one of the other valves on its seat, a hand-lever for rocking said rock-shaft, a cylinder and piston for moving the door, a pipe leading from said valve-casing into said cylinder at one side of said piston, and another pipe leading from said valve-casing into said cylinder at the other side of said piston, with a hand-pump and a pipe therefrom for delivering fluid under pressure to said fluid-pressure chamber, substantially as described.

20. A fluid-pressure system for operating bulkhead-doors and the like, comprising a valve-casing divided into two chambers, a fluid-pressure chamber, and an exhaust-chamber, double passages opening into each chamber, puppet-valves normally pressed on their seats, controlling said passages, a rock-shaft with lifting-toes for opening one of each pair of said valves in each chamber, a hand-lever for rocking said rock-shaft, a cylinder and piston for moving the door, a pipe leading from said valve-casing into said cylinder at one side of said piston, and another pipe leading from said valve-casing into said cylinder at the other side of said piston, with a hand-pump and a pipe therefrom for delivering fluid under pressure to said fluid-pressure chamber, substantially as described.

21. A fluid-pressure system for operating bulkhead-doors and the like, comprising a valve-casing divided into two chambers, a fluid-pressure chamber, and an exhaust-chamber, double passages opening into each chamber, puppet-valves controlling said passages, adjustable springs normally holding said valves on their seats, a rock-shaft with lifting-toes for opening one of each pair of said valves in each chamber, a hand-lever for rocking said rock-shaft, a cylinder and piston for moving the door, a pipe leading from said valve-casing to said cylinder at one side of said piston, and another pipe leading from said valve-casing to said cylinder at the other side of said piston, with a hand-pump and a pipe therefrom for delivering fluid under pressure to said fluid-pressure chamber, substantially as described.

22. A fluid-pressure system for operating bulkhead-doors and the like, comprising a valve-casing divided into two chambers, a fluid-pressure chamber, and an exhaust-chamber, double passages opening into each chamber, puppet-valves normally pressed on their seats controlling said passages, a rock-shaft with lifting-toes for opening one of each pair of said valves in each chamber, a hand-lever for rocking said rock-shaft, a counter-shaft gearing with said rock-shaft and projecting through the bulkhead, a hand-lever on said counter-shaft on the opposite side of the bulkhead from the rock-shaft, a cylinder and piston for moving the door, a pipe leading from said valve-casing into said cylinder at one side of said piston, and another pipe leading from said valve-casing into said cylinder at the other side of said piston, with a hand-pump and a pipe therefrom for delivering fluid under pressure to said fluid-pressure chamber, substantially as described.

23. A fluid-pressure system for operating bulkhead-doors and the like, comprising a valve-casing divided into two chambers, a fluid-pressure chamber, and an exhaust-chamber, double passages opening into each chamber, puppet-valves controlling said passages, adjustable springs normally holding said valves on their seats, a rock-shaft with lifting-toes for opening one of each pair of said valves in each chamber, a hand-lever for rocking said rock-shaft, a counter-shaft gearing with said rock-shaft and projecting through the bulkhead, a hand-lever on said counter-shaft on the opposite side of the bulkhead from the rock-shaft, a cylinder and piston for moving the door, a pipe leading from said valve-casing to said cylinder at one side of said piston, and another pipe leading from said valve-casing to said cylinder at the other side of said piston, with a hand-pump and a pipe therefrom for delivering fluid under pressure to said fluid-pressure chamber, substantially as described.

24. In a fluid-pressure system of the character described, the combination with a fluid-pressure main of an emergency-cylinder with a piston therein, a valve operated by said piston, mechanism controlled by said valve for increasing the pressure in said main, a door, and a cylinder and piston for moving said door, and two pairs of spring-seated valves controlling a supply of fluid to said cylinder, one pair being operated by increase of pressure for moving the door in one direction, with independent means operated by hand for tripping either pair of said valves for moving the door in either direction, substantially as described.

25. In a fluid-pressure system of the character described, the combination with a fluid-pressure main of an emergency-cylinder with a piston therein, a valve operated by said piston, mechanism controlled by said valve for increasing the pressure in said main, a door, and a cylinder and piston for moving said door, and two pairs of spring-seated valves controlling the supply of fluid to said cylinder, one of said pairs being operated by increase of pressure for moving the door in one direction, with a rock-shaft and tripping-toes operated by hand for tripping either pair of said valves and thus moving the door in either direction, substantially as described.

26. In an emergency system of the character described, the combination with a fluid-pressure main, and means for suddenly increasing the pressure in said main, when desired, of a door, and a cylinder and piston for moving said door, and two pairs of spring-seated valves controlling the supply of fluid to said cylinder, one pair of said valves being operated by increase of pressure, with independent means operated by hand for tripping either pair of said valves as may be desired, substantially as described.

In testimony whereof I affix my signature in presence of two witnesses.

WILLIAM BARNUM COWLES.

Witnesses:
C. W. GULTZEIT,
M. J. RUDOLPH.